(12) United States Patent
Aoyagi et al.

(10) Patent No.: US 8,885,566 B2
(45) Date of Patent: Nov. 11, 2014

(54) MOBILE COMMUNICATION SYSTEM, CONTROLLER AND METHOD

(75) Inventors: Kenichiro Aoyagi, Yokosuka (JP);
Yasuhiro Kawabe, Yokosuka (JP);
Hideyuki Matsutani, Yokohama (JP);
Yuichiro Nakamura, Zushi (JP)

(73) Assignee: NTT DoCoMo, Inc., Tokyo (JP)

( * ) Notice: Subject to any disclaimer, the term of this patent is extended or adjusted under 35 U.S.C. 154(b) by 99 days.

(21) Appl. No.: 13/640,745

(22) PCT Filed: Apr. 12, 2011

(86) PCT No.: PCT/JP2011/059109
§ 371 (c)(1),
(2), (4) Date: Oct. 12, 2012

(87) PCT Pub. No.: WO2011/129344
PCT Pub. Date: Oct. 20, 2011

(65) Prior Publication Data
US 2013/0028084 A1 Jan. 31, 2013

(30) Foreign Application Priority Data
Apr. 15, 2010 (JP) ................................ 2010-094305

(51) Int. Cl.
*H04W 4/00* (2009.01)
*H04W 52/02* (2009.01)
*H04W 76/04* (2009.01)
*H04W 72/00* (2009.01)

(52) U.S. Cl.
CPC ........ *H04W 52/0235* (2013.01); *H04W 76/046* (2013.01); *H04W 72/00* (2013.01); *Y02B 60/50* (2013.01)
USPC ......................................... 370/328

(58) Field of Classification Search
CPC ... H04W 4/00; H04W 52/00; H04W 52/0209; H04W 52/0251; H04W 72/00; H04W 72/02; H04W 76/04; H04W 76/046; H04W 84/12
USPC ........... 370/310, 311, 328–339; 455/458, 574
See application file for complete search history.

(56) References Cited

U.S. PATENT DOCUMENTS

2007/0270140 A1* 11/2007 Islam et al. .................... 455/423
2009/0129339 A1* 5/2009 Young et al. .................. 370/331

FOREIGN PATENT DOCUMENTS

JP 2009-130780 A 6/2009
WO 2009/062304 A1 5/2009

OTHER PUBLICATIONS

International Search Report w/translation issued in PCT/JP2011/059109 mailed May 24, 2011 (4 pages).
Written Opinion issued in PCT/JP2011/059109 mailed May 24, 2011 (3 pages).
3GPP TS 25.331 V8.6.0; "3rd Generation Partnership Project; Technical Specification Group Radio Access Network; Radio Resource Control (RRC); Protocol Specification (Release 8)"; Mar. 2009 (1673 pages).

* cited by examiner

*Primary Examiner* — Frank Duong
(74) *Attorney, Agent, or Firm* — Osha Liang LLP

(57) ABSTRACT

A controller in a mobile communication system includes a management unit (151) configured to manage a resource usage condition in the mobile communication system and a determination unit (152) configured to determine a timer value for determining a frequency of transmitting a state transition request signal for causing a user equipment to transition to a power saving state after completion of communication of a data signal depending on the resource usage condition, and the timer value determined by the determination unit (152) is broadcast to the user equipment.

36 Claims, 7 Drawing Sheets

FIG.2

| RNC15 | |
|---|---|
| THE NUMBER OF CONNECTING USERS | |
| Iu USAGE RATE | |
| Iub#1 USAGE RATE | |
| Iub#2 USAGE RATE | |
| Iub#3 USAGE RATE | |
| FACH USAGE RATE | |

FIG.3

| SWITCHING APPARATUS 17 | |
|---|---|
| THE NUMBER OF ATTACHES | |

| RNC16 | |
|---|---|
| THE NUMBER OF CONNECTING USERS | |
| Iur USAGE RATE | |

| BTS#1(11) | |
|---|---|
| THE NUMBER OF USED BB CARDS | |
| TRANSMIT POWER | |

| BTS#2(12) | |
|---|---|
| THE NUMBER OF USED BB CARDS | |
| TRANSMIT POWER | |

| BTS#3(13) | |
|---|---|
| THE NUMBER OF USED BB CARDS | |
| TRANSMIT POWER | |

MOBILE COMMUNICATION SYSTEM, CONTROLLER AND METHOD

TECHNICAL FIELD

The disclosed invention relates to a mobile communication system, a controller and a method.

BACKGROUND ART

A mobile apparatus in a mobile communication system transitions to some power saving states (Battery Efficient states) after completion of transmission and reception of data signals in order to reduce battery power consumption. Operating states of the mobile apparatus are managed by a controller (for example, a radio network controller (RNC) in a W-CDMA system). When the mobile apparatus changes the operating state, the mobile apparatus has to receive an indication for it from the controller. After completion of transmission and reception in a dedicated channel (DCH), the mobile apparatus transmits a state transition request signal to request transition to a power saving state. In the W-CDMA system, the state transition request signal is referred to as an RRC SIGNALING CONNECTION RELEASE INDICATION. The mobile apparatus can transition to the power saving state by receiving an indication from the controller or a network (NW). The power saving state is an idle state, a PCH state (Cell_PCH/URA_PCH), a FACH (Forward Access Channel) state for use of a FACH and so on. In the mobile communication system, a function to enable the mobile apparatus to transition to any of the power saving states after releasing the dedicated channel (DCH) to save battery energy in the mobile apparatus is called a Fast Dormancy function. See 3GPP TS25.331 v8.6.0 for the function, for example.

SUMMARY OF INVENTION

Problem to be Solved by the Invention

There are cases where the controller may or may not permit the state transition. Accordingly, it is desirable that the mobile apparatus transmits the state transition request signal immediately after completion of communication in order to transition to the power saving state rapidly and retransmits the state transition request signal rapidly if the already transmitted state transition request signal is rejected. In the case where the mobile apparatus transmits such signals frequently, however, it is necessary to reserve radio resources to transmit the signals as well as perform frequent operations in a base station and the controller. Such excessive and frequent transmissions of the state transition request signals by the mobile apparatus are not preferred from the viewpoint of network management and so on.

One object of the disclosed invention is to determine an appropriate transmission frequency of transmitting the state transition request signals for causing a user equipment to transition to a power saving state after completion of transmission and reception of data signals.

Means for Solving the Problem

One aspect of the disclosed invention relates to a controller in a mobile communication system including a management unit configured to manage a resource usage condition in the mobile communication system and a determination unit configured to determine a timer value for determining a frequency of transmitting a state transition request signal for causing a user equipment to transition to a power saving state after completion of communication of a data signal depending on the resource usage condition, wherein the timer value determined by the determination unit is broadcast to the user equipment.

Advantage of the Invention

According to the disclosed invention, it is possible to determine an appropriate transmission frequency of transmitting the state transition request signals for causing a user equipment to transition to a power saving state after completion of transmission and reception of data signals.

BRIEF DESCRIPTION OF DRAWINGS

FIG. 2 illustrates an exemplary table used to manage a resource usage condition;

FIG. 3 illustrates exemplary tables used to manage a resource usage condition;

EMBODIMENTS FOR CARRYING OUT THE INVENTION

Embodiments for carrying out the present invention are described below with reference to the drawings. Note that the same reference symbols are used for elements having the same functions throughout all the drawings for illustrating the embodiments and duplicated descriptions are omitted.

[System Arrangement]

Figure 1:
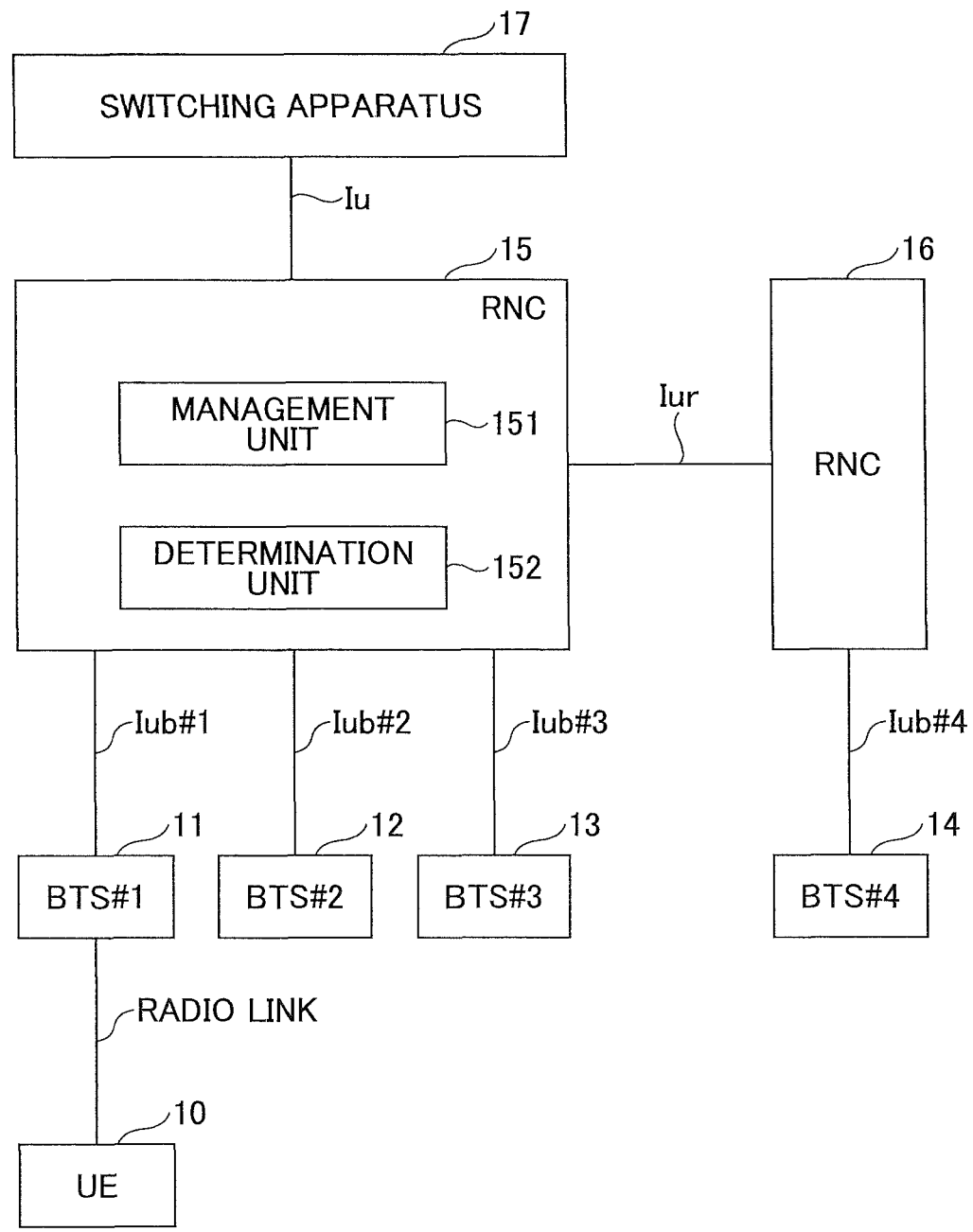
FIG. 1 illustrates a system arrangement.

FIG. 1 illustrates a mobile communication system according to one embodiment. The mobile communication system includes a mobile apparatus (UE) 10, base stations (BTS#1-4) 11-14, radio network controllers (RNCs) 15, 16 and a switching apparatus 17, which are connected as illustrated.

The mobile apparatus (UE) 10 is any apparatus wirelessly communicating with a base station. For convenience of explanation, the mobile apparatus is used, although a fixed terminal may be used. More generally, any appropriate user equipment communicating with the base station may be used. The user equipment may be, but is not limited to, a cellular phone, an information terminal, a personal digital assistant, a handheld personal computer and so on. The mobile apparatus (UE) 10 can communicate in a dedicated channel (DCH) and also operate in a power saving state in accordance with an indication from a controller such as the RNC. The power saving state is an idle state, a PCH state (Cell_PCH/URA_PCH), a FACH state using a forward access channel (FACH) or others. The mobile apparatus (UE) 10 transitions to any of the power saving states depending on indications from the controller after releasing the dedicated channel (DCH) in order to save battery energy of the mobile apparatus.

Each of the base stations (BTS#1-4) 11-14 transmits downlink radio signals and receives uplink radio signals over radio links to/from the mobile apparatuses (UE) 10 residing in respective cells. Further, the base stations (BTS#1-4) 11-14 transmit and receive downlink signals and uplink signals to/from the mobile apparatuses (UE) 10 under control by the radio network controller (RNC). Particularly in this embodiment, the base station receives a state transition request signal (RRC SIGNALING CONNECTION RELEASE INDICATION) from the mobile apparatus (UE) 10 and transmits it to the radio network controller (RNC). Then, the base station receives a state transition indication signal from the radio network controller (RNC) and transmits it to the mobile apparatus (UE) 10.

The radio network controllers (RNCs) 15 and 16 are connected to one or more base stations over inter-device interfaces Iubs#1-4 and control radio communications of the mobile apparatuses 10. The radio network controllers (RNC) 15 and 16 are connected via an inter-device interface Iur and exchange data signals and control signals. Particularly in this embodiment, the radio network controller (RNC) receives a state transition request signal from the mobile apparatus (UE) via the base stations. The radio network controller (RNC) determines to which state the mobile apparatus (UE) 10 is to transition and informs the mobile apparatus (UE) 10 of the determined state (via the base stations). The radio network controller (RNC) determines a timer value for determining a transmission frequency of the mobile apparatus 10 transmitting the state transition request signals in a manner as stated below. The timer value is broadcast to the mobile apparatuses governed by the radio network controller (RNC).

The switching apparatus 17 is connected to the radio network controller (RNC) 15 via an inter-device interface Iu. Although the illustrated radio network controller 16 is also connected to any switching apparatus, that switching apparatus may be the switching apparatus 17 as illustrated or any other non-illustrated switching apparatus. The switching apparatus 17 performs operations in a core network in the mobile communication system, for example, management of subscriber information, mobility management, control of incoming and outgoing calls, charge control and QoS control. Thus, the switching apparatus 17 may be an element serving as a Serving GPRS Support Node (SGSN), a Gateway GPRS Support Node (SGSN) and/or a Mobility Management Entity (MME).

Note that the mobile communication system may include an arbitrary number of mobile apparatuses (UEs) 10, an arbitrary number of base stations 11-14, an arbitrary number of radio network controllers (RNCs) 15, 16 and an arbitrary number of switching apparatuses 17.
[Radio Network-Controller]

As illustrated in FIG. 1, the radio network controller (RNC) 15 includes a management unit 151 and a determination unit 152. Although the radio network controller 16 also has similar functional elements, they are omitted for illustrative clarification.

The management unit 151 manages a resource usage condition in the mobile communication system. The resource usage condition may be represented by conditions as follows, for example, but is not limited to them.

Congestion Condition of Radio Network Controller (RNC) 15

This can be represented by the number of users connected to the radio network controllers (RNCs) 15, a usage condition of wired link resources, a usage rate of a forward access channel (FACH) and so on. The usage condition of wired link resources can be represented by usage conditions or usage rates of the inter-device interfaces Iu, Iur and/or Iub.

Congestion Condition of Other Apparatuses Connected to Radio Network Controller (RNC) 15

In the embodiment illustrated in FIG. 1, other apparatuses may be the base stations 11-13, the switching apparatus 17 and the radio network controller (RNC) 16 and may further include the base station 14.

The congestion condition of the base stations 11-13 can be represented by a usage condition of radio resources used by the respective base stations 11-13. For example, the congestion condition of the base stations 11-13 may be represented by the number of mobile apparatuses accessing the respective base stations 11-13, power usage conditions of the respective base stations and so on. For example, the number of accessing mobile apparatuses can be represented by the number of used baseband cards (BB). The power usage condition can be represented by what proportion of the maximum transmit power available to the base stations is used and so on. Further, a radio access restriction condition may be taken into account to determine the congestion condition of the base stations. The restriction condition can be represented by what percentage of radio accesses are currently restricted and so on.

The congestion condition of the switching apparatus 17 can be represented by the number of users (the number of attaches) subjected to mobility management by the switching apparatus 17. The information can be obtained via the inter-device interface Iu.

The congestion condition of the radio network controller (RNC) 16 can be represented by the number of users connected to the radio network controller (RNC) 16, a usage condition of the inter-device interface Iur and so on. The information can be obtained via the inter-device interface Iur.

Similar to the base stations 11-13, the congestion condition of the base station 14 can be also represented by the radio resource usage condition and can be also represented by the number of mobile apparatuses accessing the base station 14, a power usage condition of the base station and so on. The information can be obtained via the inter-device interfaces Iub and Iur. Further, the radio access restriction condition may be taken into account to determine the congestion condition of the base station. The restriction condition can be represented by what percentage of the radio accesses are currently restricted.

FIG. 2 illustrates an exemplary table for managing wired link resources and a FACH usage rate. This relates to the congestion condition of the radio network controller (RNC) 15.

FIG. 3 illustrates exemplary tables for managing the congestion conditions of the switching apparatus 17, the radio network controller (RNC) 16 and the base stations 11-13. These relate to the congestion conditions of other apparatuses connected to the radio network controller (RNC) 15.

The determination unit 152 in FIG. 1 determines a transmission frequency (a timer value for determining the transmission frequency) of the state transition request signal transmitted by a user equipment after completion of communication of data signals based on the resource usage condition managed by the management unit 151. As stated above, for the state transition request signal from the mobile apparatus 10, the determination unit 152 may or may not allow the mobile apparatus 10 to conduct the state transition. If the determination unit 152 does not allow the state transition, the destination state is not indicated. In this case, the mobile apparatus (UE) 10 can retransmit the state transition request signal after passage of a time period specified by the timer value to request availability determination of the state transition.

In general, if the amount of used resources is more than or equal to a predefined threshold (if less resources are unused), the timer value is set to a greater or longer value (for example, five seconds), and otherwise (if more resources are unused), the timer value is set to a smaller or shorter value (for example, one second). Also, the timer value may be determined in consideration of restriction conditions of individual cells as well as the magnitude of the amount of used resources. For example, if a predefined percentage or a higher percentage of radio accesses are restricted, for example, if 70% of radio accesses are restricted in a camped cell of the mobile apparatus (UE) 10, the timer value is set to a greater or longer value. On the other hand, if a lower percentage of radio accesses are restricted, the timer value is set to a smaller or shorter value.

Figure 4:
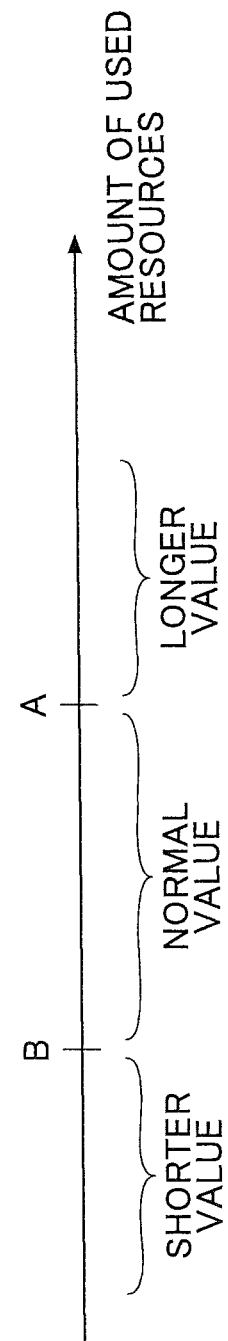
FIG. 4 illustrates a relationship between amounts of used resources and timer values.

The timer value may be set to different values (for example, 5 seconds, 3 seconds, 1 second and so on) depending on situations. In order to identify these values uniquely, multiple thresholds may be set. For example, the timer value may be set in a manner as illustrated in FIG. 4. If the amount of used resources exceeds a first threshold A, the timer value is set to a value greater or longer than a normal value. If the amount of used resources is less than the first threshold A and are greater than or equal to a second threshold B, the timer value is set to the normal value. If the amount of used resources is less than the second threshold B, the timer value is set to a value smaller or shorter than the normal value. As one example, the greater value, the normal value and the smaller value may be set to five seconds, three seconds and one second, respectively. However, they may be set to any appropriate values.

The "amount of used resources" serving as determination criteria for the determination unit 152 is determined based on one or more of the congestion conditions as illustrated in FIGS. 2-3. For example, individual items of the number of users connected to the RNC 15, the usage rates of the inter-device interfaces Iub#1-3 and the FACH usage rate are compared with respective thresholds, and the timer value may be determined based on the comparison. For example, the timer value may be determined depending on whether any of the items exceeds the respective threshold. The timer value determined by the determination unit 152 is indicated to the mobile apparatus via the base station. This indication may be included in broadcast information from the base station, for example.

[Exemplary Operations]

Figure 5:
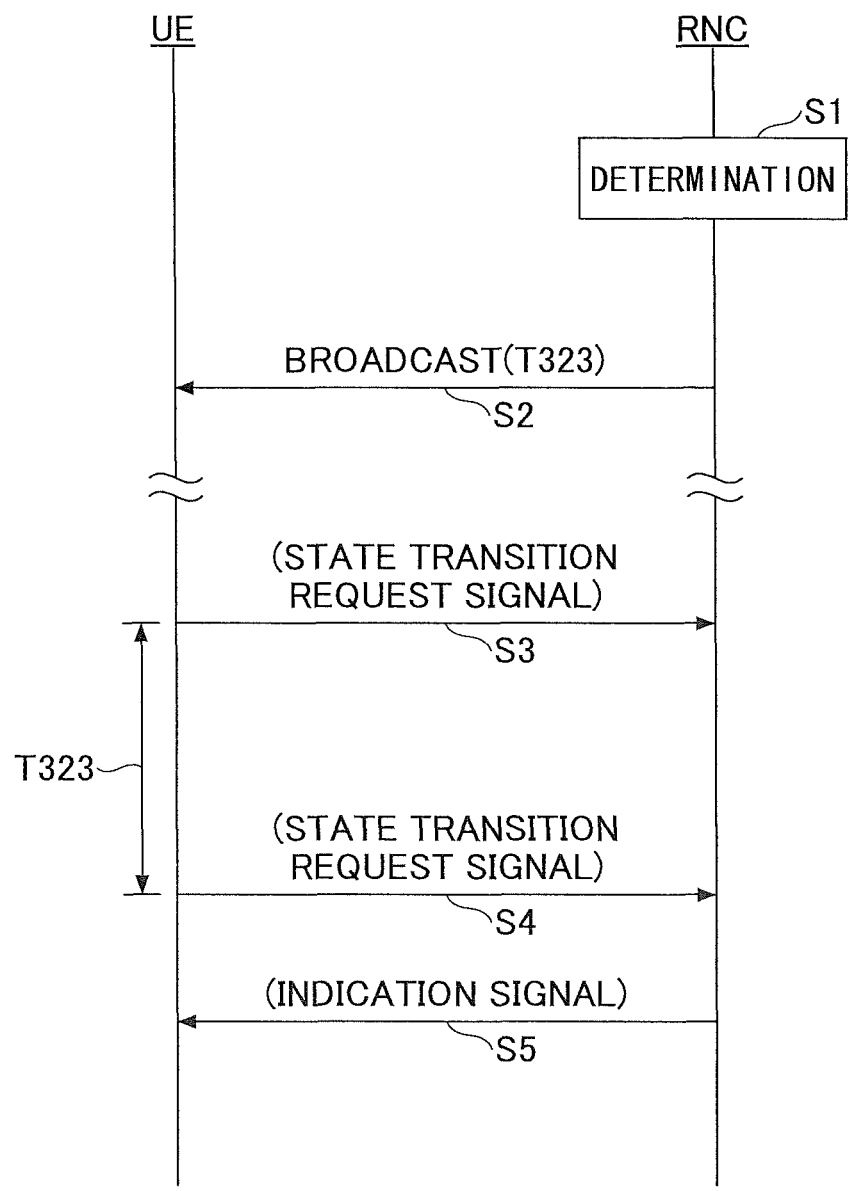
FIG. 5 is a sequence diagram illustrating exemplary operations.

FIG. 5 illustrates exemplary operations performed between the mobile apparatus (UE) 10 and the radio network controller (RNC) 15. Although these operations are conducted via the base station (BTS#1), the base station (BTS#1) is not illustrated for 0.30 illustrative simplicity.

At step S1, the radio network controller (RNC) determines the timer value for determining a transmission frequency of transmissions of the state transition request signals by a user equipment based on the resource usage condition. This determination is made by the determination unit 152.

At step S2, broadcast information is broadcast to the user equipments. This broadcast information includes the timer value determined at step S1.

At step S3, upon completion of transmission and reception of data signals in a dedicated channel (DCH), the mobile apparatus (UE) 10 transmits a state transition request signal to the radio network controller (RNC) 15 to transition to a power saving state. For example, an upper application of the mobile apparatus (UE) 10 detects that there is no data to be communicated and notifies a RRC layer of it. In response to the notification, the RRC layer transmits the state transition request signal. Then, if the mobile apparatus 10 has not received the corresponding state transition indication signal before passage of a time period specified by the timer value, the mobile apparatus 10 further transmits the state transition request signal (step S4).

At step S5, the target state (a power saving state) determined by the radio network controller (RNC) is indicated by the radio network controller (RNC) 15 to the mobile apparatus (UE) 10 via the base station (BTS#1). Subsequently, the mobile apparatus (UE) 10 transitions to the power saving state indicated by the radio network controller (RNC) 15.

On the other hand, if the mobile apparatus 10 has received the corresponding state transition indication signal within a time period specified by the timer value after transmission of the state transition request signal, the mobile apparatus 10 transitions an appropriate power saving state in accordance with the indication signal.

[Variation]

In the example illustrated in FIG. 1, the management unit 151 for managing the resource usage condition and the determination unit 152 for determining the target state are provided in the radio network controller (RNC), but this is not essential. These functional elements may be provided in another apparatus or entity.

Figure 6:
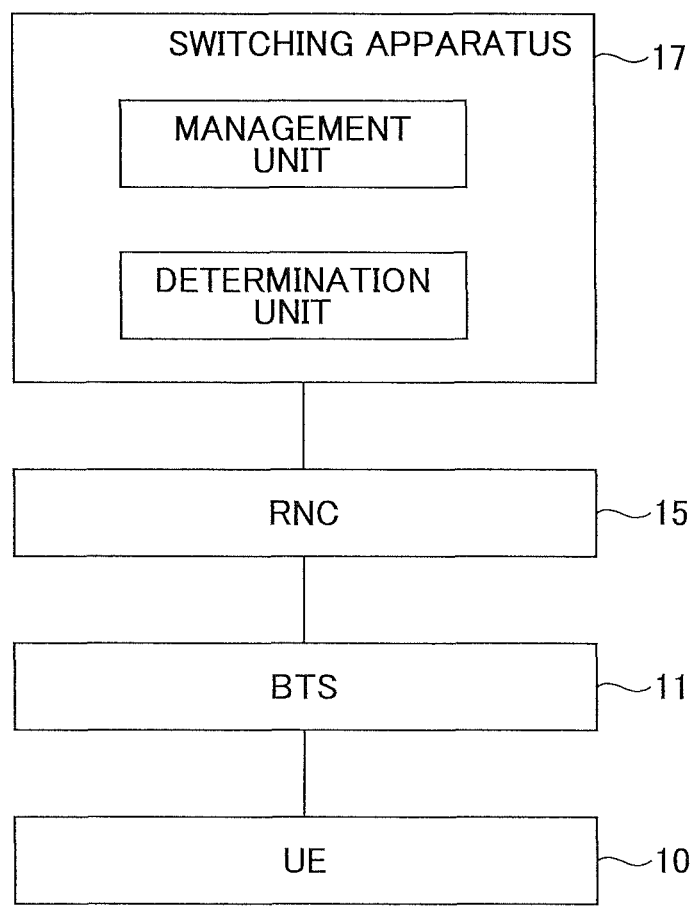
FIG. 6 illustrates an exemplary variation.
Figure 7:
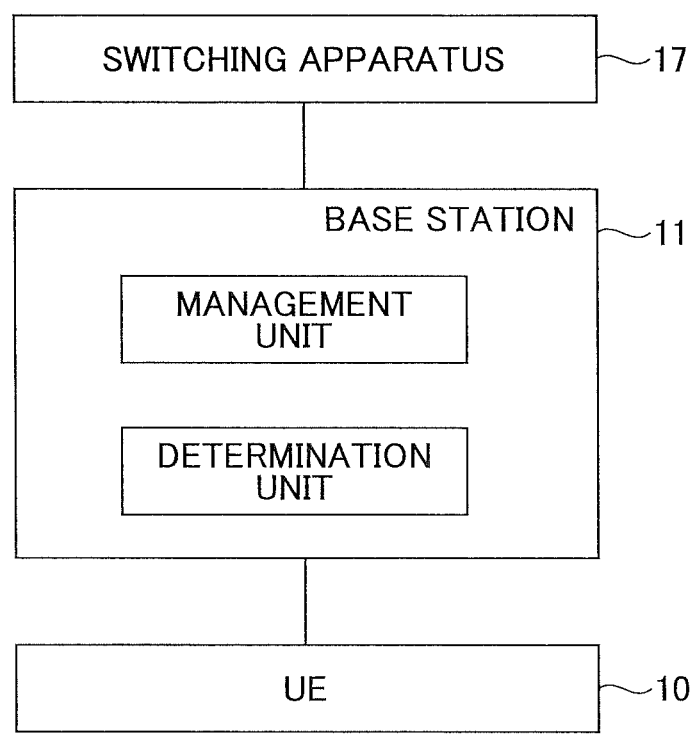
FIG. 7 illustrates an exemplary variation.

FIG. 6 illustrates that the management unit and the determination unit are provided in the switching apparatus 17. In this case, the switching apparatus 17 performs operations of the management unit 151 and the determination unit 152. FIG. 7 illustrates that the management unit and the determination unit are provided in the base station 11. In this case, the base station 11 performs operations of the management unit 151 and the determination unit 152. The embodiment as illustrated in FIG. 7 may be suitable for a system using a femto base station and an LTE (Long Term Evolution) based mobile communication system. It is preferred that at least the determination unit 152 is provided in the base station from the viewpoint of cell basis management of the timer value. On the other hand, it is preferred that at least the determination unit 512 is provided in an upper apparatus of the base station from the viewpoint of setup of the same timer value for multiple cells.

In the above examples, both the management unit and the determination unit are provided in the same functional entity (the switching apparatus, the radio network controller or the base station), but the management unit and the determination unit may be provided in separate functional elements. Further, the operations performed by the management unit may be conducted by two or more of the base station, the radio network controller and the switching apparatus. The operations performed by the determination unit may be conducted by two or more of the base station, the radio network controller and the switching apparatus.

According to the above embodiments, the transmission frequency (timer value) of the state transition request signals is determined based on determination of the congestion condition of network (NW) resources, the restriction condition, predefined usage rates of NW resources and so on in implementing the Fast Dormancy function for transitioning the mobile apparatus to power saving states. As a result of controlling the timer value variably, it is possible to utilize the NW resources efficiently and determine an appropriate one of the power saving states (UE Battery Efficient states) depending on the congestion condition of network apparatuses and the restriction condition, which can advantageously reduce battery power consumption of the mobile apparatus and shorten connection time under congestion environments.

In a mobile communication system according to one aspect of the disclosed invention, upon receiving a predefined state transition request signal from a mobile apparatus, transition to a power saving state of less battery energy consumption is indicated. The timer value for controlling the transmission frequency of the state transition request signals is determined in accordance with the usage rate of managed NW resources and a predefined logic. In this case, the timer value for controlling the transmission frequency of the state transition request signals is determined in accordance with the predefined logic with reference to at least one of a resource usage rate of a controller receiving the state transition request signals from the mobile apparatus, resource usage rates of links between the controller and other apparatuses connected to the controller and usage rates of the other apparatuses. The resource condition management and the determination of the timer value may be made in a radio controller, a radio base station apparatus and/or a switching apparatus.

In a mobile communication system according to one aspect of the disclosed invention, in response to receiving a predefined state transition request signal from a mobile apparatus, transition to a power saving state of less battery energy consumption is indicated. The timer value for controlling the transmission frequency of the state transition request signals is determined in accordance with the managed restriction condition and a predefined logic. In this case, the timer value for controlling the transmission frequency of the state transition request signals is determined in accordance with the predefined logic with reference to the restriction condition in a controller receiving the state transition request signals from the mobile apparatus. The resource condition management and the determination of the timer value may be made in a radio controller, a radio base station apparatus and/or a switching apparatus.

The present invention has been described with reference to the specific embodiments, but the embodiments are simply illustrative and variations, modifications, alterations and substitutions could be contrived by those skilled in the art. For example, the embodiments may be applied to any appropriate mobile communication system where a mobile apparatus can transition to any of multiple power saving states. For example, the present invention may be applied to a W-CDMA system, a HSDPA/HSUPA W-CDMA system, an LTE system, an LTE-Advanced system, an IMT-Advanced system, a WiMAX system, a Wi-Fi system and so on. In the above description, some specific numerical values are used for better understanding of the present invention. Unless specifically indicated, however, these numerical values are simply illustrative and any other suitable values may be used. Separation of the embodiments or items are not essential to the present invention, and two or more embodiments or items may be combined as needed. Alternatively, an item may be applied to another item (if not inconsistent). For convenience of explanation, apparatuses according to the embodiments have been described with reference to functional block diagrams, but these apparatuses may be implemented in hardware, software or combinations thereof. The software may be stored in any appropriate storage medium such as a RAM (Random Access Memory), a flash memory, a ROM (Read-Only Memory), an EPROM, an EEPROM, a register, a hard disk drive (HDD), a removable disk, a CD-ROM, a database and a server. The present invention is not limited to the above embodiments, and variations, modifications, alterations and substitutions can be made by those skilled in the art without deviating from the spirit of the present invention.

This international patent application is based on Japanese Priority Application No. 2010-094305 filed on Apr. 15, 2010, the entire contents of which are hereby incorporated by reference.

LIST OF REFERENCE SYMBOLS

10: mobile apparatus (UE)
11-14: base station (BTS#1-4)
15, 16: radio network controller (RNC)
17: switching apparatus
151: management unit
152: determination unit

The invention claimed is:

1. A controller in a mobile communication system, comprising:
   a management unit configured to manage a resource usage condition determined based on at least one of a number of connecting users, a usage condition of wired link resources and a congestion condition in wired signal processing; and
   a determination unit configured to determine a timer value for determining a frequency of transmitting a state transition request signal for causing a user equipment to transition to a power saving state after completion of communication of a data signal depending on the resource usage condition,
   wherein the timer value determined by the determination unit is broadcast to the user equipment, and
   wherein the resource usage condition is represented by the usage condition of the wired link resources and a cell restriction condition.

2. The controller as claimed in claim 1, wherein the resource usage condition is further represented by a usage condition of radio resources.

3. The controller as claimed in claim 1, wherein if the resource usage condition indicates that resources more than or equal to a first threshold are used in the mobile communication system, the determination unit sets the timer value to a value longer than a normal value.

4. The controller as claimed in claim 3, wherein if the resource usage condition indicates that resources less than the first threshold and more than or equal to a second threshold are used in the mobile communication system, the determination unit sets the timer value to the normal value.

5. The controller as claimed in claim 4, wherein if the resource usage condition indicates that resources less than the second threshold are used in the mobile communication system, the determination unit sets the timer value to a value shorter than the normal value.

6. The controller as claimed in claim 1, wherein the controller is provided in a switching apparatus.

7. The controller as claimed in claim 1, wherein the controller is provided in a radio network controller for controlling a base station.

8. The controller as claimed in claim 1, wherein the controller is provided in a base station.

9. A mobile communication system including at least a controller and a user equipment,
   the controller comprising:
   a management unit configured to manage a resource usage condition determined based on at least one of a number of connecting users, a usage condition of wired link resources and a congestion condition in wired signal processing; and
   a determination unit configured to determine a timer value for determining a frequency of transmitting a state transition request signal for causing the user equipment to transition to a power saving state after completion of communication of a data signal depending on the resource usage condition,
   wherein the timer value determined by the determination unit is broadcast to the user equipment, and
   wherein the resource usage condition is represented by the usage condition of the wired link resources and a cell restriction condition.

10. A control method in a mobile communication system, comprising:
    managing a resource usage condition determined based on at least one of a number of connecting users, a usage condition of wired link resources and a congestion condition in wired signal processing; and determining a timer value for determining a frequency of transmitting a state transition request signal for causing a user equipment to transition to a power saving state after completion of communication of a data signal depending on the resource usage condition and indicating the determined timer value to the user equipment, wherein the resource usage condition is represented by the usage condition of the wired link resources and a cell restriction condition.

11. The controller as claimed in claim 2, wherein if the resource usage condition indicates that resources more than or equal to a first threshold are used in the mobile communication system, the determination unit sets the timer value to a value longer than a normal value.

12. The controller as claimed in claim 1, wherein if the resource usage condition indicates that resources less than the first threshold and more than or equal to a second threshold are used in the mobile communication system, the determination unit sets the timer value to the normal value.

13. The controller as claimed in claim 2, wherein if the resource usage condition indicates that resources less than the first threshold and more than or equal to a second threshold are used in the mobile communication system, the determination unit sets the timer value to the normal value.

14. The controller as claimed in claim 11, wherein if the resource usage condition indicates that resources less than the first threshold and more than or equal to a second threshold are used in the mobile communication system, the determination unit sets the timer value to the normal value.

15. The controller as claimed in claim 1, wherein if the resource usage condition indicates that resources less than the second threshold are used in the mobile communication system, the determination unit sets the timer value to a value shorter than the normal value.

16. The controller as claimed in claim 2, wherein if the resource usage condition indicates that resources less than the second threshold are used in the mobile communication system, the determination unit sets the timer value to a value shorter than the normal value.

17. The controller as claimed in claim 3, wherein if the resource usage condition indicates that resources less than the second threshold are used in the mobile communication system, the determination unit sets the timer value to a value shorter than the normal value.

18. The controller as claimed in claim 11, wherein if the resource usage condition indicates that resources less than the second threshold are used in the mobile communication system, the determination unit sets the timer value to a value shorter than the normal value.

19. The controller as claimed in claim 12, wherein if the resource usage condition indicates that resources less than the second threshold are used in the mobile communication system, the determination unit sets the timer value to a value shorter than the normal value.

20. The controller as claimed in claim 13, wherein if the resource usage condition indicates that resources less than the second threshold are used in the mobile communication system, the determination unit sets the timer value to a value shorter than the normal value.

21. The controller as claimed in claim 14, wherein if the resource usage condition indicates that resources less than the second threshold are used in the mobile communication system, the determination unit sets the timer value to a value shorter than the normal value.

22. The controller as claimed in claim 2, wherein the controller is provided in at least one from a group consisting of a switching apparatus, a radio network controller for controlling a base station, and the base station.

23. The controller as claimed in claim 3, wherein the controller is provided in at least one from a group consisting of a switching apparatus, a radio network controller for controlling a base station, and the base station.

24. The controller as claimed in claim 4, wherein the controller is provided in at least one from a group consisting of a switching apparatus, a radio network controller for controlling a base station, and the base station.

25. The controller as claimed in claim 5, wherein the controller is provided in at least one from a group consisting of a switching apparatus, a radio network controller for controlling a base station, and the base station.

26. The controller as claimed in claim 11, wherein the controller is provided in at least one from a group consisting of a switching apparatus, a radio network controller for controlling a base station, and the base station.

27. The controller as claimed in claim 12, wherein the controller is provided in at least one from a group consisting of a switching apparatus, a radio network controller for controlling a base station, and the base station.

28. The controller as claimed in claim 13, wherein the controller is provided in at least one from a group consisting of a switching apparatus, a radio network controller for controlling a base station, and the base station.

29. The controller as claimed in claim 14, wherein the controller is provided in at least one from a group consisting of a switching apparatus, a radio network controller for controlling a base station, and the base station.

30. The controller as claimed in claim 15, wherein the controller is provided in at least one from a group consisting of a switching apparatus, a radio network controller for controlling a base station, and the base station.

31. The controller as claimed in claim 16, wherein the controller is provided in at least one from a group consisting of a switching apparatus, a radio network controller for controlling a base station, and the base station.

32. The controller as claimed in claim 17, wherein the controller is provided in at least one from a group consisting of a switching apparatus, a radio network controller for controlling a base station, and the base station.

33. The controller as claimed in claim 18, wherein the controller is provided in at least one from a group consisting of a switching apparatus, a radio network controller for controlling a base station, and the base station.

34. The controller as claimed in claim 19, wherein the controller is provided in at least one from a group consisting of a switching apparatus, a radio network controller for controlling a base station, and the base station.

35. The controller as claimed in claim 20, wherein the controller is provided in at least one from a group consisting of a switching apparatus, a radio network controller for controlling a base station, and the base station.

36. The controller as claimed in claim 21, wherein the controller is provided in at least one from a group consisting of a switching apparatus, a radio network controller for controlling a base station, and the base station.

* * * * *